(12) United States Patent
Paranjpe et al.

(10) Patent No.: US 11,973,773 B2
(45) Date of Patent: Apr. 30, 2024

(54) DETECTING AND MITIGATING ZERO-DAY ATTACKS

(71) Applicant: Arbor Networks, Inc., Westford, MA (US)

(72) Inventors: Prateek R. Paranjpe, Pune (IN); Amol B. Patil, Wakad (IN); Bhargav M. Pendse, Pune (IN)

(73) Assignee: ARBOR NETWORKS, INC., Westford, MA (US)

( * ) Notice: Subject to any disclaimer, the term of this patent is extended or adjusted under 35 U.S.C. 154(b) by 195 days.

(21) Appl. No.: 16/927,594

(22) Filed: Jul. 13, 2020

(65) Prior Publication Data

US 2021/0359977 A1 Nov. 18, 2021

(30) Foreign Application Priority Data

May 15, 2020 (IN) .............................. 202011020499

(51) Int. Cl.
*H04L 9/40* (2022.01)
*G06F 18/23213* (2023.01)
*G06N 20/00* (2019.01)

(52) U.S. Cl.
CPC .... *H04L 63/1425* (2013.01); *G06F 18/23213* (2023.01); *G06N 20/00* (2019.01); *H04L 63/0236* (2013.01); *H04L 63/0263* (2013.01)

(58) Field of Classification Search
CPC ............. H04L 63/0236; H04L 63/0263; H04L 63/1425; G06N 20/00; G06K 9/6223; G06F 21/53
See application file for complete search history.

(56) References Cited

U.S. PATENT DOCUMENTS 8,839,435 B1* 9/2014 King ................... H04L 63/1425
726/22
9,686,301 B2* 6/2017 Lietz ................... H04L 63/1425
(Continued)

OTHER PUBLICATIONS

Title: A Hybrid Algorithm to Detect Malware and Eliminate Zero Day Attacks Authors: John Ngubiri, Lwomwa Joseph Date: 2011 Publisher: Academia.*
(Continued)

*Primary Examiner* — William S Powers
*Assistant Examiner* — Gita Faramarzi
(74) *Attorney, Agent, or Firm* — Foley & Lardner LLP

(57) ABSTRACT

Determining malicious activity in a monitored network using clustering algorithmic techniques in which a source of known malicious network entities and known legitimate network entities associated with network traffic flow are provided. A dataset is generated consisting of a plurality of known malicious network entities and a plurality of known legitimate network entities. Network related attributes are identified associated with each of the plurality of malicious network entities and the plurality of legitimate network entities contained in the generated dataset. A predetermined number (X) of clusters is generated based upon the plurality of malicious (bad) and legitimate (good) network entities. A generated cluster is tagged with a bad, good or an unknown tag. If a generated cluster is determined assigned a bad tag, it is then stored it in a database and assigned a clusterID for future use in machine learning techniques for detecting network attacks upon the monitored network.

14 Claims, 4 Drawing Sheets

(56) References Cited

U.S. PATENT DOCUMENTS

| | | | |
|---|---|---|---|
| 10,469,528 B2* | 11/2019 | Bjarnason | H04L 63/1458 |
| 11,263,566 B2* | 3/2022 | Maheshwari | G06Q 10/06314 |
| 2013/0246422 A1* | 9/2013 | Bhargava | G06F 16/40 |
| | | | 707/E17.089 |
| 2017/0063930 A1* | 3/2017 | Chesla | H04L 63/1425 |
| 2018/0004948 A1* | 1/2018 | Martin | H04L 63/1425 |
| 2018/0276371 A1* | 9/2018 | Haukli | G06F 21/53 |
| 2019/0158517 A1* | 5/2019 | Muddu | G06F 3/0482 |
| 2019/0188212 A1* | 6/2019 | Miller | H04L 63/145 |
| 2019/0190930 A1* | 6/2019 | Miron | H04L 69/22 |

OTHER PUBLICATIONS

Title: A Survey on Zero-Day Polymorphic Worm Detection Techniques Authors: Ratinder Kaur and Maninder Singh Date:2014 Publisher: IEEE.*

* cited by examiner

DETECTING AND MITIGATING ZERO-DAY ATTACKS

FIELD OF THE INVENTION

The disclosed embodiments generally relate to the field of data security. More specifically, an embodiment of the disclosure relates to a system, apparatus and method that enhances detection of zero-day attacks.

BACKGROUND OF THE INVENTION

The Internet is a global public network of interconnected computer networks that utilize a standard set of communication and configuration protocols. It consists of many private, public, business, school, and government networks. Within each of the different networks are numerous host devices such as workstations, servers, cellular phones, portable computer devices, to name a few examples. These host devices are able to connect to devices within their own network or to other devices within different networks through communication devices such as hubs, switches, routers, and firewalls, to list a few examples.

Over the last decade, software attacks have become a pervasive problem for Internet users and enterprise network administrators. A particular type of attack is a zero-day attack. A zero-day attack typically refers to a security or malware attack that occurs before public disclosure of a vulnerability that the attack exploits. An attacker may discover the vulnerability inadvertently or by studying the software system that contains the vulnerability. By studying the software system, or by learning about the vulnerability from others, the attacker may develop a method or program for exploiting the vulnerability.

Notably, the attacker may keep the vulnerability and the exploit secret. The secrecy of the vulnerability and the exploit may make it far more difficult to detect or prevent the attack. Accordingly, the attacker may desire to maintain and take steps to ensure the secrecy. For the same reason, the attacker may only launch the attack on a small number of targets. The attacker may specify high value targets or may specify targets requiring a long time to compromise. Because the zero-day attack may be more difficult to detect, the attack can be better suited for targeting a smaller number of high value targets, especially over a long period of time.

Currently, cybersecurity tools have relied on signatures detection techniques for detecting network attacks, but due to evolving tools and techniques used by hackers, signature based security measures are proving ineffective. For instance, signatures detect known problems, but they fail to detect zero day attacks even if there is small change in the payload or methodology used by hacker. Because of the secretive nature of zero-day attacks, not much is currently known about them. For example, relatively little is known about the prevalence, successfulness, or dangerousness of zero-day attacks. When attacks are finally discovered, the discovery is typically fortuitous and not representative of zero-day attacks in general. The lack of representative samples or more comprehensive data about zero-day attacks may make it more difficult to study the attacks and guard against them (e.g. by resolving vulnerabilities, developing patches, immunizing systems, and/or taking counter-measures against zero-day attackers).

Because zero-day attacks may exploit vulnerabilities that are not yet disclosed to the public, traditional security systems that rely on antivirus or intrusion-detection signatures may fail to detect these attacks. The failure of security systems to detect attacks may provide attackers with a long window to exploit their targets. For this reason, zero-day exploits are often used in targeted attacks. Moreover, security attacks often target non-executable files, which traditional security systems may have particular difficulty analyzing. Accordingly, the instant disclosure identifies and addresses a need for additional and improved systems and methods for analyzing zero-day attacks.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, the illustrated embodiments generally relate to utilizing machine learning techniques for implementing clustering algorithms to detect suspicious entities (e.g., network events, devices, users) on a network, which detected entities are associated with known bad entities (e.g., malicious traffic). As described herein, clustering algorithms are machine learning algorithms used to group (cluster) similar network entities together. Regarding a network entity, for purposes herein, it is to be understood to be an entity on a network which can be modelled by viewing associated network data, preferably both good data (e.g., associated with legitimate traffic) and bad data (e.g., associated with malicious attack traffic). For instance, possible network entities include (but are not to be understood to be limited to): 1) Network Events (e.g., request/response pair, log, network traffic flow information such as netflow, IPFIX, and the like); 2) Network Devices (e.g., preferably identified by a device ID and/or by associated network traffic patterns created by a network device); and 3) Network Users (e.g., identified by User ID information and/or by associated network traffic pattern created by a User). In accordance with the illustrated embodiments, clustering algorithms trained with labelled data (e.g., data identifying preferably both known good network events and known bad network events) to generate data models configured and operable to categorize a detected network entity as either legitimate or malicious. And in the scenario a detected network entity can neither be categorized as either legitimate or malicious, then it is labeled as "unknown".

To achieve these and other advantages and in accordance with the purpose of the illustrated embodiments described is a computer implemented method and system for determining malicious activity using clustering algorithmic techniques in which a source of known malicious network entities and known legitimate network entities associated with network traffic flow are provided. A dataset is generated consisting of a plurality of known malicious network entities and a plurality of known legitimate network entities from the sources of known malicious network entities and known legitimate network entities. Network related attributes are then identified associated with each of the plurality of malicious network entities and the plurality of legitimate network entities contained in the generated dataset. A predetermined number (X) of clusters is generated for the plurality of malicious and legitimate network entities, wherein an individual cluster is a clustering of malicious network entities and/or legitimate network entities having determined like associated attributes according to prescribed criteria. Next, a generated cluster is tagged with a tag wherein: 1) a malicious tag is applied when a majority type of known malicious network entities are clustered; 2) a legitimate tag is applied when a majority type of known legitimate network entities are clustered; and 3) an unknown tag is applied when neither a majority type of known legitimate network entities or known legitimate network entities are clustered. If a generated cluster is determined assigned a malicious tag, it is then stored it in a database indicative of malicious network entities and it is assigned a clusterID for future reference with clusters generated from captured real-time network traffic flow for detecting network attacks. In the event a generated cluster from the at least one dataset is not assigned a malicious tag, then a determination is made as to whether the current number of generated clusters (X) exceeds a predetermined threshold number (Y). If no, then the value of X is increased by 1 and return is made to the generating a predetermined number (X) of clusters step.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

Figure 1:
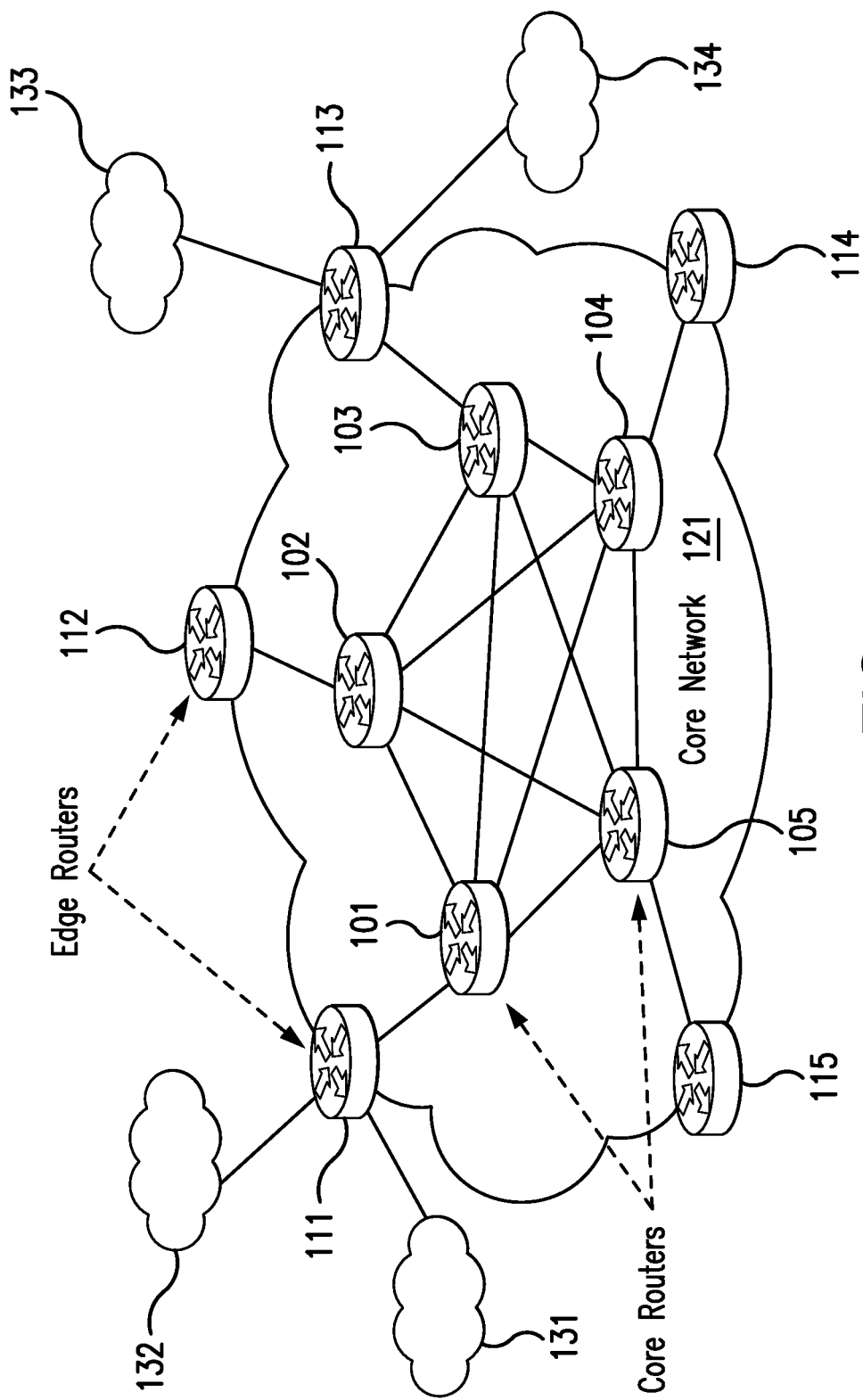
FIG. 1 is a schematic diagram illustrating a general structure of an ISP network wherein the system and method of the illustrated embodiments generally may be utilized.

The illustrated embodiments are now described more fully with reference to the accompanying drawings, in which illustrated embodiments are shown wherein like reference numerals identify like elements. The illustrated embodiments are not limited in any way to what is shown as the illustrated embodiments described below are merely provided exemplary purposes and ease of description. The illustrated embodiments are to be understood to be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the illustrated embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which the illustrated embodiments belongs. Although any methods and materials similar or equivalent to those described herein can also be used in the practice or testing of the illustrated embodiments, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated that the illustrated embodiments as discussed below preferably include a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the illustrated embodiments based on the below-described embodiments. Accordingly, the illustrated embodiments are not to be limited by what has been particularly shown and described, except as indicated by the appended claims.

In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hardwired) or temporarily configured (e.g. programmed) to operate in a certain manner and to perform certain operations described herein.

It is to be further understood the illustrated embodiments describe a system, apparatus and method for using clustering algorithmic techniques on network traffic data to detect zero-day attacks. Turning now descriptively to the drawings, in which similar reference characters denote similar elements throughout the several views, FIG. 1 illustrates a general structure of an ISP network wherein the system and method of the illustrated embodiments generally may be utilized (but are not to be limited thereto). The ISP network in FIG. 1 is preferably composed of two types of IP routers: core routers 101-105 and edge routers 111-115. The core routers interconnect with one another to form a core network 121, which is responsible for exchanging data for defined networks, such as protected network 200, described below. By contrast, edge routers are responsible for connecting external networks 131-134 with the core network 121.

Figure 2:
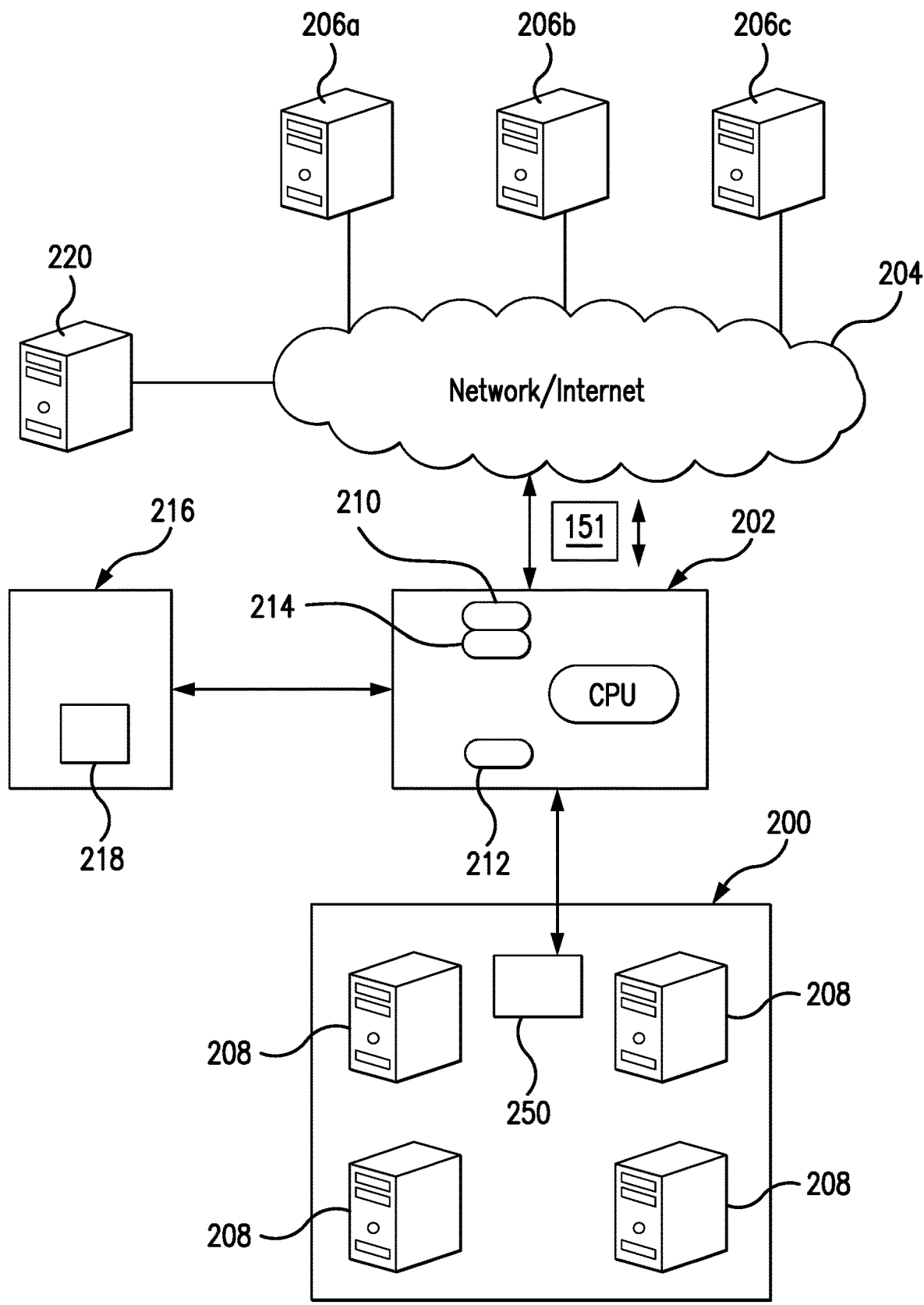
FIG. 2 is a schematic diagram showing network architecture and the relationship between an edge router device and a protected network according to the illustrated embodiments.

With the general structure of an ISP network described above (FIG. 1), reference is now made to FIG. 2 illustrating the relationship between a network monitoring device 202 (e.g., a network probe), core router device 250, protected network 200, Internet 204, and external host devices 206a-206c, 220 to be used in accordance with an aspect of the illustrated embodiments.

In a typical implementation, the external host devices 206a-206c, 220 (also referred to as external devices or host devices) attempt to connect to protected devices 208 within the protected network 200 typically via a private network or a public computer network such as the Internet 204. Examples of external host devices 206a-206c, 220 include servers, laptops, desktop computers, tablet devices, mobile phones, mobile computing devices, video games systems, televisions and other similar devices and systems having Internet connectivity.

In a preferred embodiment, the protected network 200 is protected by a network monitoring device 202, which is shown as an edge router device in FIG. 2. It is to be appreciated that in accordance with the illustrated embodiments, network monitoring device 202 is shown as an edge router device in FIG. 2 for illustrative purposes only as it is to be understood network monitoring device 202 is not to be limited to such an edge router device as it may also be configured as a core router device 250. For instance, the network monitoring device 202 may be embodied in the Arbor Sightline/TMS monitoring device commercially available from NetScout Technologies Inc. Preferably operatively coupled to the network monitoring device 202 is a network management system 216 operatively associated with one or more databases 218. Usually, the protected network 200 is an enterprise network, such as a school network, business network, and government network, to list a few examples. Network management device 216, and network monitoring device 202, are to be understood to include computer resources necessary to carry out the functionality of the illustrated embodiments as described herein with regards to a generated machine learning model for preferably detecting zero-attacks. The network monitoring device 202 preferably includes a packet processing system having an external high-speed network interface 210 and a protected high-speed network interface 212 and a storage device 214. Under current technology, these interfaces are capable of handling 1.0-100 Gbps, for example. The network monitoring device 202 may further include processors that preferably process the packets received at interfaces 210 and 212.

Figure 3:
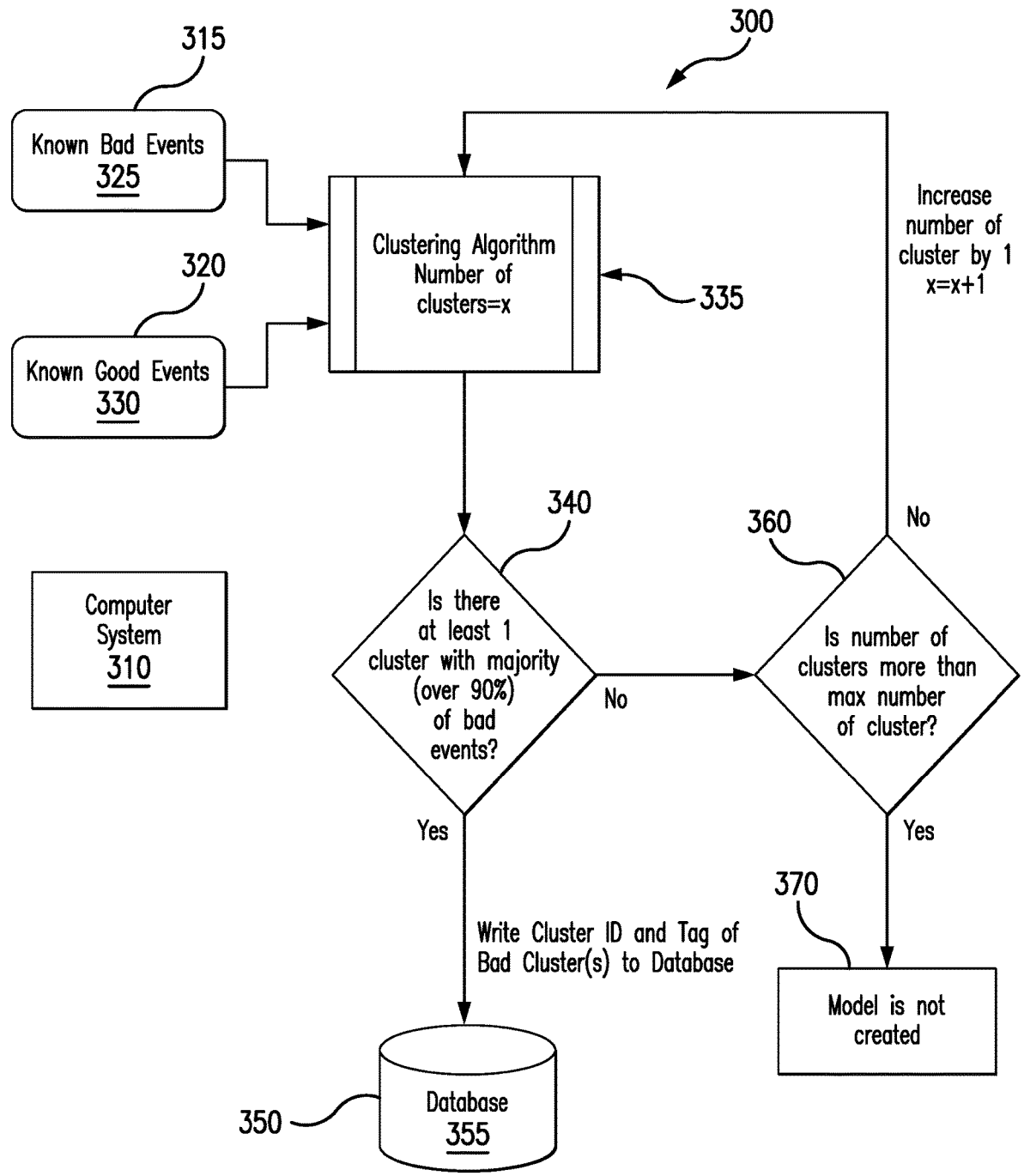
FIGS. 3 and 4 are flow charts depicting operation of the certain illustrated embodiments.
Figure 4:
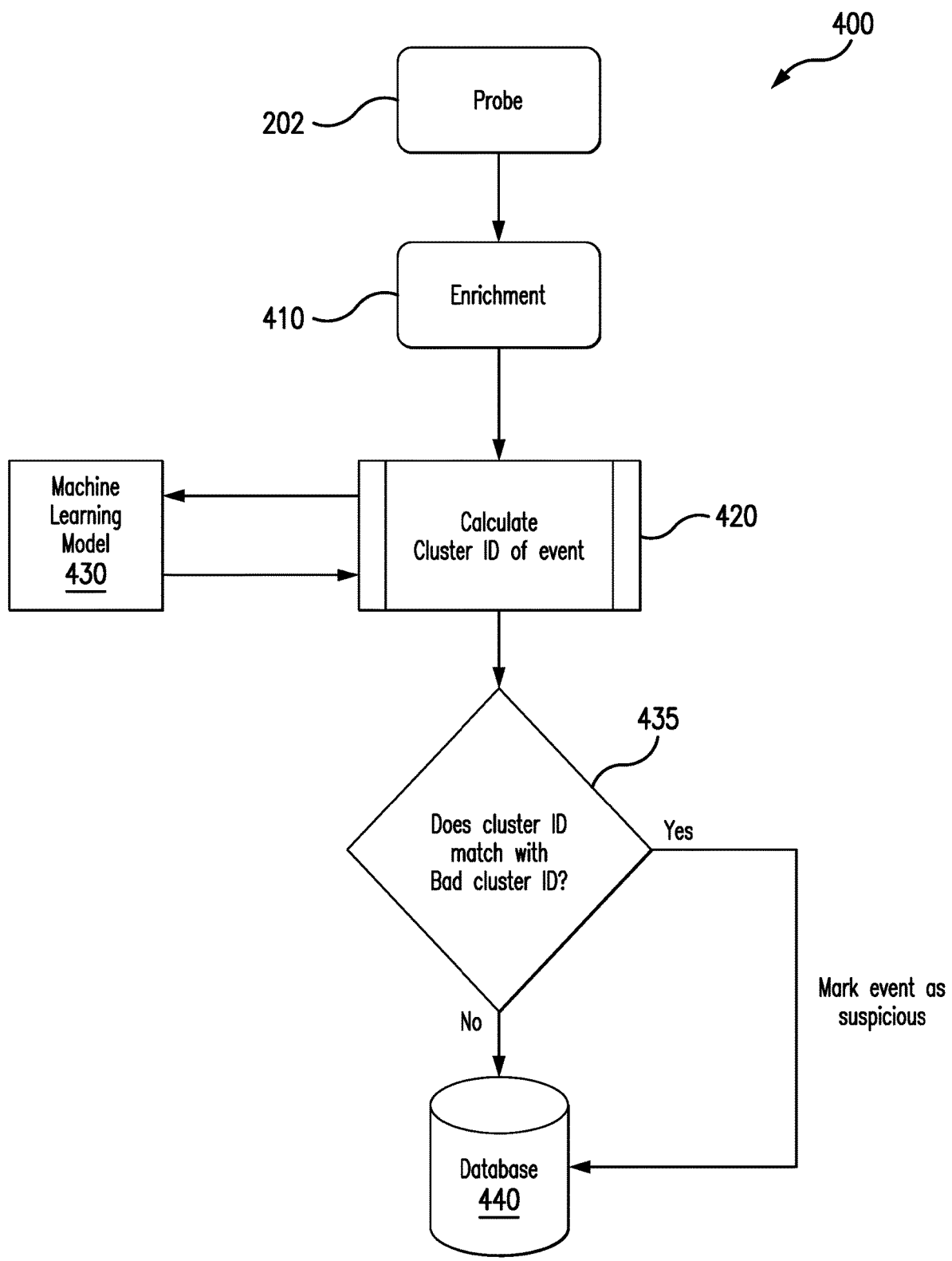

With reference now to FIGS. 3 and 4 (and with continuing reference to FIG. 2), description of operation of a specifically configured computing system 310 having the necessary components and resources (such as with regards to those described above in conjunction with network monitoring device 202) operable to utilize machine learning techniques 300 for implementing clustering algorithms to detect suspicious network entities is described. Clustering algorithms trained with labelled data (e.g., data identifying preferably both known good network entities and known bad network entities) generate machine learning data models (to be used in network monitoring device 202, as discussed further below) which categorize a detected network entity preferably as either legitimate (good) or malicious (bad).

Before turning to the descriptions of FIGS. 3 and 4, it is noted that the illustrated flow diagrams are shown by way of example. Although it is to be understood these operational steps may be carried out in any system and are not limited to the scenario shown in the aforementioned figures. Additionally, the flow diagrams of FIGS. 3 and 4 illustrate examples in which operational steps are carried out in a particular order, as indicated by the lines connecting the blocks, but the various steps shown in these diagrams can be performed in other orders, or in any combination or subcombination. It should be appreciated that in some embodiments some of the steps described below may be combined into a single step. In some embodiments, one or more additional steps may also be included.

Starting now with reference to the machine learning model process 300 of FIG. 3, shown is a flowchart depicting certain operational steps preferably performed by the computing device 300 in accordance with illustrative embodiments. Starting at steps 315 and 320, preferably retrieved from data sources 325 and 330 are known malicious network entities (315) and known legitimate network entities (320). It is to be appreciated that possible network entities may include (but are no to be understood to be limited thereto): 1) Network Events (e.g., request/response pair, log, network traffic flow information such as netflow. IPFIX, and the like); 2) Network Devices (e.g., preferably identified by a device ID and/or by associated network traffic patterns created by a network device); and 3) Network Users (e.g., identified by User ID information and/or by associated network traffic pattern created by a User). It is to be further appreciated that for ease of description purposes, network entities discussed in accordance with the illustrated embodiment are to be described below in accordance with network "events". Thus, the below description is to be equally applicable to other types of captured network entities, such as network devices and network users.

Next, at a data clustering stage (step 335), the computing system 300 generates at least one dataset consisting of a plurality of known malicious network events and a plurality of known legitimate network events from the sources (325, 330) of known malicious (bad) network entities and known legitimate (good) network entities. For instance, a known bad event may be in communication to/from blacklisted IP address and URL. Additionally for instance, a known bad event may be associated with blacklisted payload like file or SSL certificates or POST payload. It is to be appreciated that in accordance with the illustrated embodiments, all other network events that are not "bad" are then considered to be "good" network events.

Next, continuing with the data clustering stage (335), network related attributes are then determined that are preferably associated with each of the aforesaid determined "bad" events, and also preferably the determined "good" events. It is to be appreciated that any suitable network attributes may be utilized, including for instance (and not to be understood to be limited to) (and with regards to network events being used for network entities for ease of description purposes) may consist of one or more of: request bytes; response bytes; request packets; response packets; event duration; event payload size; response code; and event direction associated with the captured network traffic flow. It is to be appreciated that the determined attribute values, if required, are transformed to a suitable format for subsequent algorithmic clustering processing, as to be described below.

Next, a predetermined number (X) of clusters based upon the plurality of determined malicious (bad) and legitimate (good) events is generated. The initial predetermined number of clusters (X) is preferably user prescribed (e.g., 10). Preferably, an individual cluster is a clustering of determined associated like attributes according to prescribed criteria. The generated clusters are then tagged based upon a majority type of events clustered in that cluster. A malicious tag is applied to a generated cluster having a majority percentage of known malicious events, and conversely a legitimate tag is applied to a generated cluster having a majority of known legitimate events. And preferably an unknown tag is applied to a cluster neither having a majority of either known malicious or legitimate events. It is to be understood that in accordance with the illustrated embodiments, the aforesaid "majority" is preferably determined in regards to a percentage value that is preferably user configurable. For instance, the majority percentage value may be prescribed to be 90%, meaning a majority is reached only when certain type of events are greater than 90% of the total event types in a particular generated cluster. Additionally, and in accordance with the illustrated embodiments, a cluster is preferably tagged in the event it also has more than a prescribed threshold number of clustered events (e.g., 1000), which threshold number is also preferably user configurable. For instance, if a certain generated cluster consists has more than 90% of a certain bad event type, and there are more than 1000 of those bad event types in the generated cluster, than that generated cluster is tagged with having a majority of bad events.

Next, at step 340, a determination is made as to whether if a generated cluster is tagged with a malicious ("bad") tag. If yes, then the process 300 proceeds to assign (label) that cluster with a cluster ID, indicating it has been tagged with a malicious ("bad") tag, which is then preferably stored in a database (355) to be preferably used as an algorithmic machine learning model 430 (FIG. 4) for subsequent detection of malicious traffic (step 350)(as described further below with reference to FIGS. 2 and 4).

And if no, meaning a generated cluster was determined not to be tagged with a malicious ("bad") tag, then a determination is made as to whether if the current number of generated clusters (X) exceeds a predetermined threshold number (Y) in the event a generated cluster is not assigned a malicious tag (step 360). If yes, (step 370) then an algorithmic model for detecting suspicious traffic is not created based upon the known bad events (325) and known good events (330) provided in steps 315, 320. And if no, meaning the current number of generated clusters (X) does not exceed the predetermined threshold number (Y), then the value X is preferably increased by 1 and the process 300 returns to the above described clustering algorithm stage (335) for repetition thereof.

With reference now to FIGS. 2 and 4 (and with continuing reference to FIG. 3), now described is the process 400 for utilizing the machine learning algorithmic model (430) (as described above in FIG. 3) for detecting suspicious traffic. Starting at step 410, in a traffic flow 151 received by the network monitoring device 202, included in the traffic flow is data packets transmitting to and from external devices 220, 206a-206c with one or more protected devices 208 (e.g., servers). Data communications (e.g., server connection requests) occurring between one or more external computers 220, 206a-206c in a monitored computer network 204 seeking connection with devices (e.g., 208) in a protected network 200 are intercepted by the network monitoring device/probe 202. For instance, possible network entities included in the captured traffic may include (but are not to be understood to limited to): 1) Network Events (e.g., request/response pair, log, network traffic flow information such as netflow, IPFIX, and the like); 2) Network Devices (e.g., preferably identified by a device ID and/or by associated network traffic patterns created by a network device); and 3) Network Users (e.g., identified by User ID information and/or by associated network traffic pattern created by a User). It is to be appreciated that for ease of description purposes, captured network entities are to be described below in accordance with network "events". Thus, the below description is to be equally applicable to other types of captured network entities, such as network devices and network users.

Next, step 420, determined by utilizing the aforesaid determined machine learning algorithmic model (430), is a clusterID for network events contained in the captured network traffic flow 151. It is to be appreciated that the clusterID for the network events contained in the captured network traffic flow 151 is preferably determined in real-time. Next (step 435), a determination is made as to whether the determined real-time clusterID (step 420) matches with a clusterID stored in a database 355 (as performed in step 350) indicative of malicious network entities. If yes, the network monitoring device/probe 202 preferably labels the determined real-time clusterID as bad, which is then preferably stored in a database 440 for preferably subsequent use to thwart a network attack, such as a zero-day attack (e.g., performance of one or more mitigation actions). And if no, then the network monitoring device/probe 202 preferably labels the determined real-time clusterID as good, which is also then preferably stored in a database 440 for preferably subsequent use for indicating the associated network event is associated with legitimate (good) network traffic to ensure one more mitigations actions are not unnecessarily performed thereon.

With the certain illustrated embodiments described above, it is to be appreciated that certain advantages of the certain illustrated embodiments include using clustering for classification with labeled data to detect zero-day attacks by using machine learning techniques to label network entities as either good (e.g., legitimate) or bad (e.g., malicious). With the illustrated embodiments discussed above, it is to be appreciated the various embodiments disclosed herein can be implemented as any combination of hardware, firmware, and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the illustrated embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was

What is claimed is:

1. A computer implemented method for determining prior malicious activity using a machine learning clustering algorithmic technique, and real-time malicious activity for captured network, the method comprising the steps:
   (I) determining prior malicious activity by using a machine learning clustering algorithmic technique including:
   providing a source of known malicious network devices and known legitimate network devices associated with network traffic flow;
   generating a dataset comprising a plurality of known malicious network devices and a plurality of known legitimate network devices from the sources of known malicious network devices and known legitimate network devices;
   identifying network related attributes associated with each of the plurality of malicious network devices and the plurality of legitimate network devices contained in the generated dataset;
   generating a predetermined number (X) of clusters, by the machine learning clustering algorithmic technique, based upon the plurality of malicious network devices and the plurality of legitimate network devices, wherein an individual cluster of the predetermined number (X) of clusters is a clustering of malicious network devices and/or legitimate network devices having determined like associated attributes according to prescribed criteria;
   tagging respective clusters of the predetermined number (X) of clusters with a tag wherein:
      a malicious tag is applied when a majority type of known malicious network devices are clustered in a given cluster of the predetermined number (X) of clusters;
      a legitimate tag is applied when a majority type of known legitimate network devices are clustered in a second given cluster of the predetermined number (X) of clusters; and
      an unknown tag is applied when neither a majority type of known legitimate network devices or known legitimate network devices are clustered in a third given cluster of the predetermined number (X) of clusters;
   determining that a cluster of the predetermined number (X) of clusters was tagged with the malicious tag;
   storing the cluster of the predetermined number (X) of clusters in the dataset comprising the plurality of known malicious network devices and the plurality of known legitimate network devices from the sources of know malicious network devices and known legitimate network devices;
   assigning the cluster of the predetermined number (X) of clusters with a clusterID for future reference with clusters generated from captured real-time network traffic flow for detecting network attacks wherein the clusterID is indicative of a particular network device; and
   increasing, responsive to determining that a number of clusters (X) included in the predetermined number (X) of clusters is less than a predetermined threshold (Y) and based on one or more clusters of the predetermined number (X) of clusters having not be assigned the malicious tag, a value of the number of clusters (X) by 1 and then returning to the generating a predetermined number (X) of clusters step; and
   (II) determining real-time malicious activity for captured network including:
   capturing network traffic flow associated with a monitored computer network;
   determining a real-time clusterID for a network device contained in the captured network traffic flow utilizing the machine learning clustering algorithmic technique for determining prior malicious activity; and
   determining whether the real-time clusterID matches with a clusterID stored in the dataset.

2. The computer implemented method as recited in claim 1, wherein determining malicious activity relates to determining zero-day attacks associated with the monitored network.

3. The computer implemented method as recited in claim 1, wherein the plurality of known malicious network devices are associated with blacklisted IP addresses.

4. The computer implemented method as recited in claim 1, wherein the plurality of known malicious network devices are associated with blacklisted payload components.

5. The computer implemented method as recited in claim 1, wherein the plurality of known malicious network devices are associated with network events that include one or more of: request bytes; response bytes; request packets; response packets; event duration; event payload size; response code; and event direction.

6. The computer implemented method as recited in claim 1 wherein the majority type of known malicious network devices is determined by a percentage value of a network device type clustered in that cluster.

7. The computer implemented method as recited in claim 6, wherein the percentage is 90% or greater.

8. The computer implemented method as recited in claim 6, wherein the percentage value is user configurable.

9. The computer implemented method as recited in claim 1, wherein a fourth given cluster of the predetermined number (X) of clusters is tagged when the fourth cluster has more than a prescribed threshold number of clustered network devices.

10. The computer implemented method as recited in claim 9, wherein the prescribed threshold number of clustered network devices is equal to, or greater than, one thousand (1000).

11. The computer implemented method as recited in claim 1, wherein the predetermined threshold (Y) is user configurable.

12. The computer implemented method as recited in claim 1, further including the step of marking the network device as suspicious of a network attack when it is determined that the real-time clusterID matches with the clusterID stored in the dataset.

13. The computer implemented method as recited in claim 1, wherein the network traffic is captured in real-time.

14. The computer implemented method as recited in claim 13, wherein the machine learning clustering algorithmic technique is used for determining the real-time clusterID for the network device.

* * * * *